United States Patent
Hayashi (10) Patent No.: US 6,614,411 B2
(45) Date of Patent: *Sep. 2, 2003

(54) PLASMA ADDRESS DISPLAY APPARATUS (75) Inventor: Masatake Hayashi, Gifu (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/386,219

(22) Filed: Aug. 31, 1999

(65) Prior Publication Data

US 2002/0105486 A1 Aug. 8, 2002

(30) Foreign Application Priority Data

Sep. 8, 1998 (JP) .......................................... P10-253147

(51) Int. Cl.$^7$ ................................................ G09G 3/28
(52) U.S. Cl. .............................. 345/60; 345/66; 345/67; 313/484
(58) Field of Search ....................... 345/60–72; 359/54, 359/55, 87; 313/484, 485, 582, 584

(56) References Cited

U.S. PATENT DOCUMENTS

| 5,221,979 A | * | 6/1993 | Kim ............................ 340/771 |
| 5,570,104 A | * | 10/1996 | Hayashi ....................... 345/60 |
| 5,805,122 A | * | 9/1998 | Bongaerts et al. ............. 345/60 |
| 5,907,311 A | * | 5/1999 | Yano ............................ 345/71 |
| 5,923,389 A | * | 7/1999 | Seki ............................ 345/60 |
| 6,002,382 A | * | 12/1999 | Hayashi et al. ............... 345/60 |

FOREIGN PATENT DOCUMENTS

JP    4-265931    9/1992

* cited by examiner

Primary Examiner—Dennis-Doon Chow
(74) Attorney, Agent, or Firm—Sonnenschein, Nath & Rosenthal

(57) ABSTRACT

A plasma address display apparatus is composed of a flat panel, a scanning circuit, and a signal circuit. The flat panel has a layered structure wherein a plasma cell having scanning electrodes disposed in rows and a display cell having signal electrodes disposed in columns are placed one on the other. The scanning circuit successively applies a selection pulse to the scanning electrodes to effect scanning of the display cell. The signal circuit supplies image data to the signal electrodes in synchronism with the scanning to write the image data for individual scanning lines. The plasma cell has discharge channels formed in rows such that they are isolated from each other, and a plurality of scanning electrodes are allocated to each of the discharge channels. The scanning circuit successively applies a selection pulse to the scanning electrodes allocated to a discharge channel to cause discharge to occur so that, for example, at least two scanning lines are formed in each one discharge channel. Since at least two scanning lines are formed in each one discharge channel, the plasma address display apparatus can achieve realization in numerical aperture and also in resolution.

11 Claims, 8 Drawing Sheets

PLASMA ADDRESS DISPLAY APPARATUS

BACKGROUND OF THE INVENTION

1. Field of the Invention

This invention relates to a plasma address display apparatus which includes a flat panel including a display cell and a plasma cell placed one on the other and peripheral circuits, and more particularly to a plasma address display apparatus which has a high resolution of scanning lines formed on a plasma cell.

2. Description of the Related Art

Figure 1:
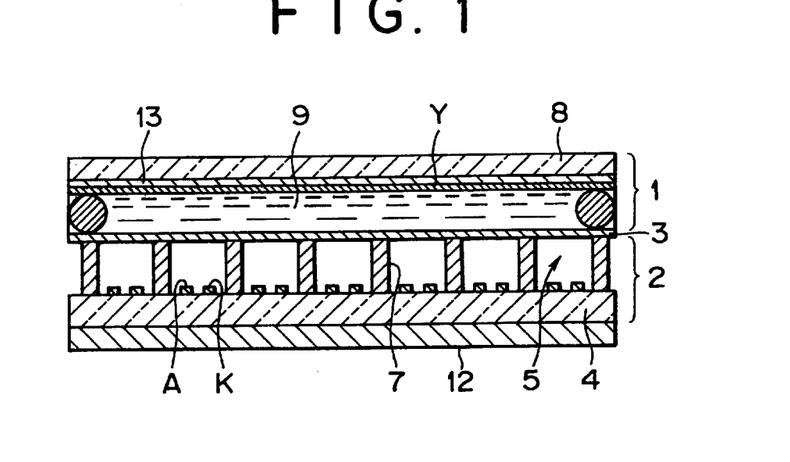
FIG. 1 is a sectional view showing a conventional plasma address display apparatus.

A plasma address display apparatus is disclosed, for example, in Japanese Patent Laid-Open No. Hei 4-265931 and has such a structure as shown in FIG. 1. Referring to FIG. 1, the plasma address display apparatus shown has a flat panel structure which includes a display cell 1, a plasma cell 2, and a common intermediate sheet 3 interposed between the display cell 1 and the plasma cell 2. The intermediate sheet 3 is formed from a very thin glass plate or the like and called microsheet. The plasma cell 2 is formed from a lower side glass substrate 4 adhered to the intermediate sheet 3, and discharge allowing gas is enclosed in a space defined between the glass substrate 4 and the intermediate sheet 3. Scanning electrodes in the form of stripes are formed on an inner surface of the lower side glass substrate 4.

The scanning electrodes function as anodes A and cathodes K. Barriers 7 are formed such that the anodes A and the cathodes K may be sectioned so that an anode A and a cathode K in pair may be included in each section, and divide the space in which the discharge allowing gas is enclosed to define discharge channels 5 in each of which an anode A and a cathode K are included. Each adjacent ones of the discharge channels 5 are isolated from each other by a barrier 7. The barriers 7 can be formed by printing and baking using screen printing, and contact at the tops thereof with one face of the intermediate sheet 3. Plasma discharge occurs between an anode A and a cathode K in each discharge channel 5 delimited by a pair of barriers 7. The intermediate sheet 3 and the lower side glass substrate 4 are adhered to each other by glass frit or the like.

The display cell 1 includes a transparent upper side glass substrate 8. The glass substrate 8 is adhered to the other face side of the intermediate sheet 3 by a seal member or the like with a predetermined gap left therebetween, and liquid crystal 9 is enclosed as an electro-optical substance in the gap. Signal electrodes Y are formed on an inner surface of the upper side glass substrate 8. Pixels are formed in a matrix at intersecting locations of the signal electrodes Y and the discharge channels 5. Also a color filter 13 is provided on the inner surface of the glass substrate 8, and, for example, three primary colors of R, G and B are allocated to the individual pixels by the color filter 13. The flat panel having such a construction as described above is of the transmission type, and, for example, the plasma cell 2 is positioned on the light incoming side and the display cell 1 is positioned on the light outgoing side of the flat panel. A backlight 12 is mounted on the plasma cell 2 side.

In the plasma address display apparatus having such a construction as described above, the discharge channels 5 in rows are switchably scanned line-sequentially so that plasma discharge may successively occur therein, and image data is applied to the signal electrodes Y on the display cell 1 side in synchronism with the scanning to effect display driving of the plasma address display apparatus. When plasma discharge occurs in a discharge channel 5, then the potential in the discharge channel 5 becomes an anode potential substantially uniformly, and pixel selection for each one scanning line is performed.

In particular, one discharge channel 5 corresponds to one scanning line and functions as a sampling switch. If image data is applied to each pixel in a condition wherein the plasma sampling switch is in a conducting state, then sampling of the image data occurs and lighting or extinction of the pixel is controlled with the sampled image data. After the plasma sampling switch is put into a non-conducting state, the image data is held as it is in the pixel. In other words, the display cell 1 modulates incoming light from the backlight 12 into outgoing light in accordance with image data to display an image based on the image data.

Figure 2:
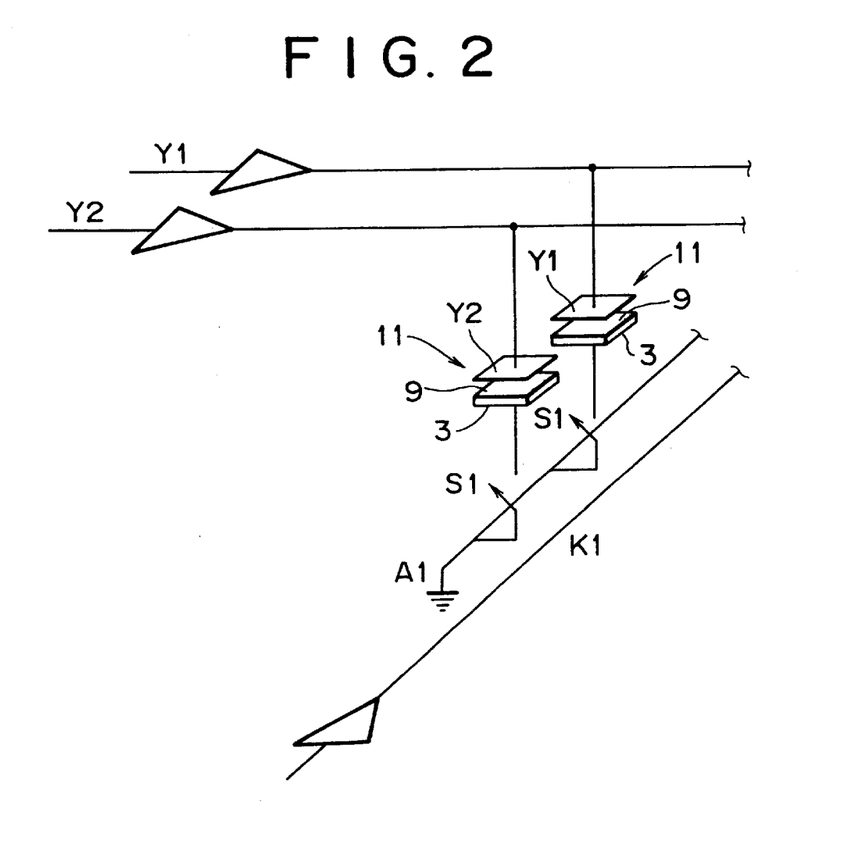
FIG. 2 is a schematic diagrammatic view illustrating operation of the conventional plasma address display apparatus shown in FIG. 1.

FIG. 2 shows two exemplary pixels of the plasma address display apparatus shown in FIG. 1. Referring to FIG. 2, only two signal electrodes Y1 and Y2, one cathode K1 and one anode A1 are shown in order to facilitate understanding. Each of the pixels 11 has a layered structure including a signal electrode Y1 or Y2, the liquid crystal 9, the intermediate sheet 3 and a discharge channel. The discharge channel is connected to the anode potential almost substantially during plasma discharge. When, in this state, image data is applied to each of the signal electrodes Y1 and Y2, then charge is injected into the liquid crystal 9 and the intermediate sheet 3.

On the other hand, when the plasma discharge comes to an end, then the discharge channel restores an insulating state and comes to have a floating potential, and consequently, the charge injected is held by the pixel 11. In other words, a sampling holding operation is performed. Since the discharge channel functions as an individual sampling switching element provided for each of the pixels 11, it is schematically represented using a switching symbol S1. In the meantime, the liquid crystal 9 and the intermediate sheet 3 held between each of the signal electrodes Y1 and Y2 and the discharge channel function as a sampling capacitor. When the sampling switch S1 is put into a conducting state by line sequential scanning, the image data is written into the sampling capacitor, and a lighting or extinguishing operation of each pixel is performed in response to the data voltage level. Even after the sampling switch SI is put into a non-conducting state, the data voltage is held by the sampling capacitor. An active matrix operation of the display apparatus is performed in this manner. It is to be noted that an effective voltage to be actually applied to the liquid crystal 9 depends upon a capacitance division between the liquid crystal 9 and the intermediate sheet 3.

In the plasma address display apparatus having the structure described above, in order to raise the resolution of an image, the density of pixels arranged in rows and columns must be increased. In order to reduce the size of the pixels in the horizontal direction (direction of a row), the line width of the signal electrodes which extend in the direction of a column should be reduced. On the other hand, in order to reduce the size of pixels in the vertical direction (direction of a column), the arrangement pitch of discharge channels which extend in the direction of a row should be reduced.

However, the discharge channels are isolated from each other by the barriers. From a point of view of a working technique, it is difficult to make the thickness of the barriers extremely thin, and a minimum depth is fixed in order to assure a mechanical strength and so forth. Therefore, if the arrangement pitch of the discharge channels is decreased, then a rate in which the thickness of the barriers occupies increases relatively, and therefore, the area of the aperture of the panel through which light actually passes is sacrificed. In other words, as the number of discharge channels, that is, the number of scanning lines, increases, the numerical aperture of the panel decreases. Further, since the barriers have some height dimension, they intercept rays of light coming in from oblique directions. Accordingly, as the arrangement pitch of the barriers decreases, the rate at which incoming rays of light in oblique directions are intercepted increases and the visual angle when the panel is observed by an observer decreases.

Figure 3:
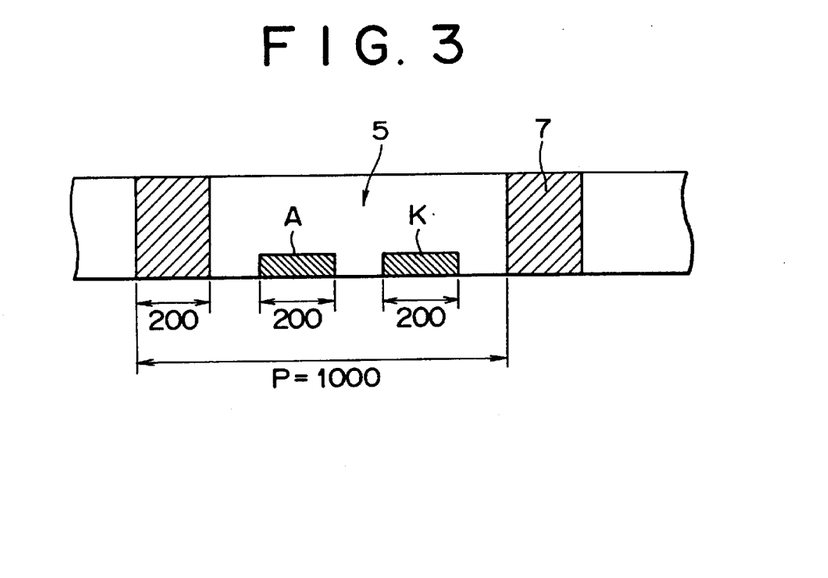
FIG. 3 is a schematic sectional view showing a structure of a plasma cell of the conventional plasma address display apparatus shown in FIG. 1.

When it is tried to increase the resolution of a plasma address display apparatus, a limitation of a process of production of barriers and scanning electrodes is encountered and a drop of the numerical aperture cannot be avoided. As a result, the brightness of the display unit becomes insufficient. If the amount of light to be emitted from a backlight is increased in order to compensate for the insufficient brightness, then this gives rise to an increase in power consumption. Further, if the barrier and electrode structure is formed further finely, then the ratio at which defects occur increases, and it is difficult to satisfy both of the productivity and the numerical aperture. For example, in the structure of a plasma cell shown in FIG. 3, the discharge channel 5 is formed with an arrangement pitch P of 1,000 $\mu$m. The width of the barriers 7 is 200 $\mu$m, and the widths of the anode A and the cathode K are 200 $\mu$m. Accordingly, the numerical aperture of the panel shown is determined as 1−(200+200+200)/1,000=0.4 and accordingly is 40%. If the arrangement pitch P is decreased from 1,000 $\mu$m to 700 $\mu$m, then the numerical aperture is determined as 1−(200+200+200)/700=0.14 and thus decreases down to 14%. In this instance, if the electrode widths of the anode A and the cathode K are decreased, then the numerical aperture can be increased to some degree. However, if the electrode widths are decreased, then disconnection and so forth become liable to occur and this gives rise to a drop of the yield. Consequently, the productivity drops remarkably.

SUMMARY OF THE INVENTION

It is an object of the present invention to provide a plasma address display apparatus which has a comparatively high numerical aperture and resolution.

In order to attain the object described above, according to an aspect of the present invention, there is provided a plasma address display apparatus, comprising a flat panel wherein a plasma cell having a plurality of scanning electrodes disposed in rows and a display cell having a plurality of signal electrodes disposed in columns are placed one on the other, a scanning circuit for successively applying a selection pulse to the scanning electrodes to effect scanning of the display cell, and a signal circuit for supplying image data to the signal electrodes in synchronism with the scanning by the scanning circuit to write the image data individually for the scanning lines, the plasma cell having a plurality of discharge channels formed in the rows in an isolated relationship from each other such that each of the discharge channels contains discharge allowing gas and has a plurality of scanning electrodes allocated thereto, the scanning circuit successively applying a selection pulse to the plurality of scanning electrodes allocated to each of the discharge channels to cause discharge to occur so that the plurality of scanning lines may be formed in each of the discharge channels.

Preferably, the signal circuit writes image data of the same polarity to the plurality of scanning lines which belong to one discharge channel and writes image data of the opposite polarity into the scanning lines which belong to an adjacent discharge channel to perform ac driving of the display cell.

The plasma address display apparatus may be constructed such that each of the discharge channels includes a pair of barriers which define a space extending in a row, a scanning electrode disposed below each of the barriers, and a central scanning electrode disposed in the middle between the scanning electrodes on the opposite sides in the space, and a scanning line is defined between the scanning electrode disposed below one of the barriers and the central scanning electrode while another one scanning line is defined between the scanning line disposed below the other barrier and the central scanning electrode. In this instance, the scanning circuit may apply a selection pulse to the central scanning electrode to cause discharge to occur in the substantially entire discharge channel and then apply a selection pulse to the scanning electrode disposed below the other barrier to cause discharge to occur in a substantially one half of the discharge channel so that the two scanning lines corresponding to the one half and the other half of the discharge channel may be formed in the discharge channel.

According to another aspect of the present invention, there is provided a plasma address display apparatus, comprising a flat panel wherein a plasma cell having a plurality of scanning electrodes disposed in rows and a display cell having a plurality of signal electrodes disposed in columns are placed one on the other, a scanning circuit for successively applying a selection pulse to the scanning electrodes to effect scanning of the display cell, and a signal circuit for supplying image data to the signal electrodes in synchronism with the scanning by the scanning circuit to write the image data individually for the scanning lines, the plasma cell having a plurality of discharge channels formed in the rows in an isolated relationship from each other such that each of the discharge channels contains discharge allowing gas and has scanning electrodes allocated thereto which function as an anode and a cathode, the scanning circuit successively applying a selection pulse to the scanning electrodes allocated to each of the plurality of discharge channels to cause discharge to occur between the anode and the cathode to form the plurality of scanning lines in the discharge channel making use of a transition state after the discharge, the signal circuit supplying image data to the signal electrodes in response to the transition state after the discharge to write separate image data into the plurality of scanning lines.

Preferably, the signal circuit writes image data of the same polarity to the plurality of scanning lines which belong to one discharge channel and writes image data of the opposite polarity into the plurality of scanning lines which belong to an adjacent discharge channel to perform ac driving of the display cell.

The plasma address display apparatus may be constructed such that each of the discharge channels includes a pair of barriers which define a space extending in a row, and a scanning electrode disposed below each of the barriers and functioning as an anode and a cathode, and a plurality of scanning lines included in each of the discharge channels is spatially separated from each other across the boundary in the middle between the pair of barriers. In this instance, each of the discharge channels may include an additional scanning electrode along the middle between the pair of barriers and assists discharge between the anode and the cathode.

The plasma address display apparatus may be constructed otherwise such that each of the discharge channels includes a pair of barriers which define a space extending in a row and a pair of scanning electrodes disposed between the barriers and functioning as an anode and a cathode, and a plurality of scanning lines included in each of the discharge channels are spatially separated from each other across the boundary in the middle between the pair of barriers.

Each of the plasma address display apparatus according to the present invention described above includes at least two scanning lines formed in each of discharge channels isolated from each other to drive a display cell. In order to form at least two scanning lines in one discharge channel, two scanning electrodes, for example, are provided for one discharge channel. With the plasma address display apparatus, when compared with conventional plasma address display apparatus, the numbers of scanning electrodes and barriers are reduced to one half, and the density of scanning lines is increased at least to twice. Consequently, the resolution of the pixels can be raised as much. From the opposite point of view, where a pixel density may be equal to that of conventional plasma address display apparatus, the arrangement pitch of the display channels can be increased at least to twice. As a result, remarkable augmentation in productivity and numerical aperture can be achieved, and the power consumption of a backlight can be reduced as much. In addition, since the number of barriers decreases to one half, the limitation to the visual angle in the upward and downward directions of a screen is moderated, and also the visual angle can be increased.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENTS

1. First Embodiment

Figure 4A:
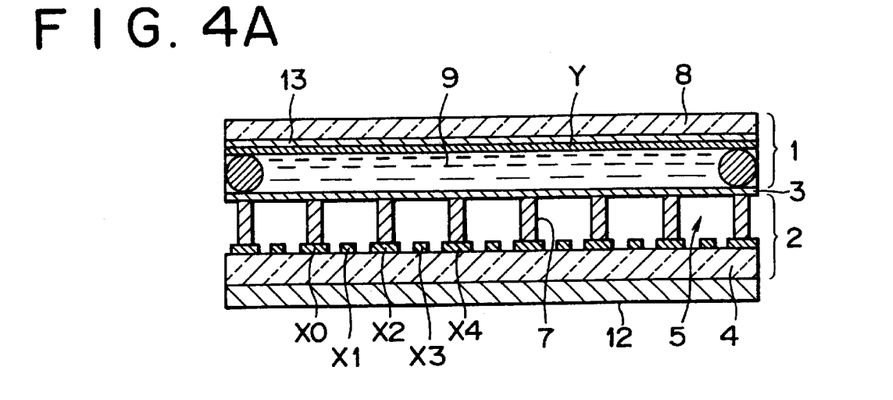
FIG. 4A is a schematic sectional view showing a plasma address display apparatus to which the present invention is applied.

A plasma address display apparatus to which the present invention is applied is basically composed of a flat panel, and a peripheral scanning circuit and signal circuit, and a structure of the flat panel is shown in FIG. 4A. Referring to FIG. 4A, the flat panel shown has a layered structure wherein a display cell 1 and a plasma cell 2 are placed one on the other with a common intermediate sheet 3 interposed therebetween. The plasma cell 2 includes a lower side glass substrate 4 adhered to the intermediate sheet 3, and discharge allowing gas such as, for example, xenon gas or neon gas is enclosed in a space between the lower side glass substrate 4 and the intermediate sheet 3.

Scanning electrodes X in the form of stripes are formed on an inner surface of the lower side glass substrate 4. The scanning electrodes X alternately have different widths. In FIG. 4A, the wider scanning electrodes are denoted by X0, X2, X4, . . . , and the narrower scanning electrodes are denoted by X1, X3, . . . Barriers 7 are formed along and just above the wider scanning electrodes X0, X2, X4, . . . and divide the space in which the discharge allowing gas is enclosed to define discharge channels 5. The barriers 7 can be formed by printing and baking using screen printing, and contact at the tops thereof with one face side of the intermediate sheet 3. As seen in FIG. 4A, adjacent ones of the discharge channels 5 are isolated from each other by a barrier 7. Thus, just two scanning electrodes X are allocated to one discharge channel 5. For example, to a certain one of the discharge channels 5, the scanning electrodes X1 and X2 are allocated, and to the next discharge channel 5, the scanning electrodes X3 and X4 are allocated.

The display cell 1 includes a transparent upper side glass substrate 8. The glass substrate 8 is adhered to the other face side of the intermediate sheet 3 with a predetermined gap left therebetween by a seal member or the like, and liquid crystal 9 is enclosed as an electro-optical substance in the gap. Signal electrodes Y are formed on an inner surface of the upper side glass substrate 8. Pixels in the form of a matrix are formed at intersecting locations of the signal electrodes Y and the discharge channels 5. Also a color filter 13 is provided on the inner surface of the glass substrate 8 and allocates, for example, three primary colors of R, G and B to the individual pixels. The flat panel having the construction described above is of the transmission type, and, for example, the plasma cell 2 is positioned on the light incoming side while the display cell 1 is positioned on the light outgoing side. A backlight 12 is mounted on the plasma cell 2.

Figure 4B:
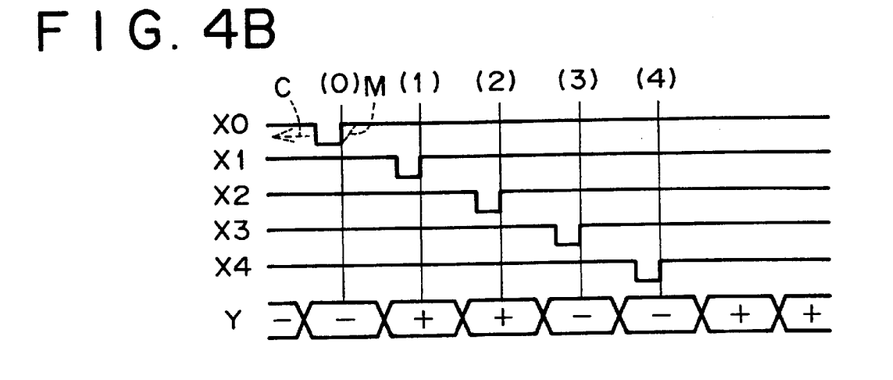
FIG. 4B is a timing chart illustrating operation of the plasma address display apparatus shown in FIG. 4A.

Referring to FIG. 4B, a timing chart illustrating operation of the plasma address display apparatus of FIG. 4A, the peripheral scanning circuit of the plasma address display apparatus successively applies a selection pulse to the scanning electrodes X0, X1, X2, X3, X4, . . . . Each selection pulse has a negative polarity with respect to the ground potential. In the timing chart of FIG. 4B, a selection pulse is applied to the scanning electrode X0 at the 0th timing (represented by a number surrounded by a circle: this similarly applies to the following description), and a next selection pulse is applied to the scanning electrode X1 at the first timing; a selection pulse is applied to the scanning electrode X2 at the second timing; a further selection pulse is applied to the scanning electrode X3 at the third timing; and a still further selection pulse is applied to the scanning electrode X4 at the fourth timing. Thereafter, a selection pulse is successively applied to the scanning electrodes X similarly.

The peripheral signal circuit of the plasma address display apparatus of FIG. 4A supplies image data to all of the signal electrodes Y in synchronism with the scanning circuit. In the timing chart of FIG. 4B, image data of the negative polarity is supplied at the 0th timing; image data of the positive polarity is applied at the first and second timings; and image data of the negative polarity is applied at the third and fourth timings. Thereafter, image data is successively applied to the signal electrodes Y in a similar manner.

At the 0th timing, the image data of the negative polarity supplied to the signal electrodes Y are sampled and written into pixels for one scanning line at a point of time when the selection pulse applied to the scanning electrode X0 restores the ground level. Actually, however, data writing is not performed simultaneously with the selection pulse due to an influence of metastable particles included in the plasma and so forth, and a decay denoted by M appears. Writing of the image data is performed also at the decay.

On the contrary, the amount of image data to be written can be adjusted by utilizing the decay. For example, the writing amount or the writing range can be adjusted by displacing the phase of the selection pulse forwardly relative to the image data as indicated by an arrow C in FIG. 4B. Then at the first timing, the image data of the positive polarity applied to the signal electrodes Y is sampled at a point of time when the selection pulse applied to the scanning electrode X1 restores the ground level. Thereafter, the image data are successively sampled at the second, third and fourth timings in a similar manner.

Figure 4C:
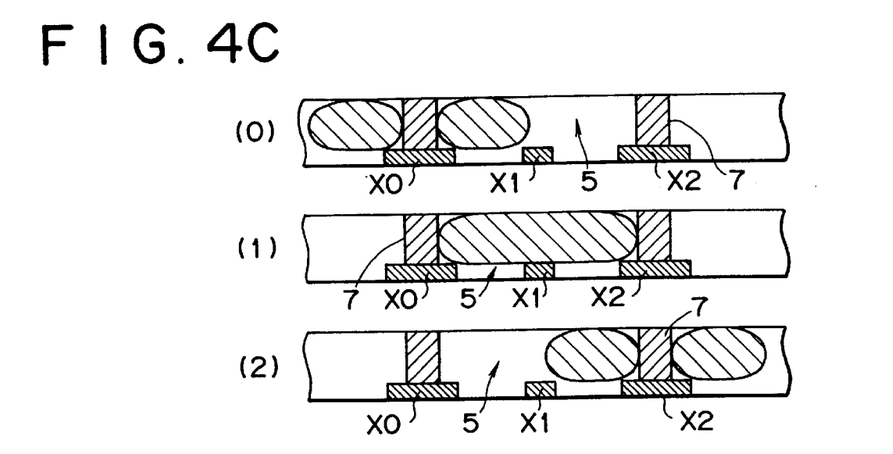
FIG. 4C is a schematic sectional view illustrating operation of the plasma address display apparatus shown in FIG. 4A with respect to time.

FIG. 4C illustrates variations of a charge channel at the 0th, first and second timings with respect to time. First at the 0th timing, a selection pulse is applied to the scanning electrode X0 positioned just below one of the barriers 7 of the charge channel 5. As a result, plasma discharge occurs between the scanning electrode X0 and a pair of scanning electrodes positioned on the opposite sides of the scanning electrode X0 and having the ground level. In FIG. 4C, such plasma discharge is represented by slanting lines. If notice is taken of the discharge channel 5 positioned at the center in FIG. 4C, the left half of the noticed discharge channel 5 has the anode potential as a result of the plasma discharge, and forms one scanning line. The image data of the negative polarity is written into the pixels on the scanning line. However, the image data of the negative polarity is not originally allocated to the noticed discharge channel 5 at the center, but allocated to the discharge channel positioned on the left side of the noticed discharge channel 5.

Then, when the first timing comes, a selection pulse is applied to the noticed scanning electrode X1 at the center, and plasma discharge occurs between the scanning electrode X1 and the scanning electrodes X0 and X2 on the opposite sides of the scanning electrode X1. As a result, two scanning lines are formed, and the image data of the positive polarity is written into the pixels on the two scanning lines. In particular, the image data of the negative polarity written into the first scanning line at the 0th timing is rewritten into the image data of the positive polarity immediately at the first timing. The image data of the positive polarity is the original image data allocated to the first scanning line. Then, when the second timing comes, a selection pulse is applied to the scanning electrode X2, and plasma discharge occurs between the scanning electrode X2 and the scanning electrodes positioned on the opposite sides of the scanning electrode X2. If notice is taken of the discharge channel 5 at the center, plasma discharge occurs between the scanning electrodes X1 and X2, and a second scanning line is formed. The next image data of the positive polarity is written into the scanning line. In particular, the image data of the positive polarity written into the second scanning line at the first timing is rewritten into the next original image data of the positive polarity at the second timing. When a selection pulse is applied to the scanning electrode X1 at the center, plasma discharge spreads to the entire discharge channel 5, but when a selection pulse is applied to the scanning electrode X0 or X2 positioned just below a barrier 7, plasma discharge occurs at a portion substantially one half the discharge channel 5. Therefore, the image data written into the first scanning line at the first timing is maintained as it is even when the second timing comes, but the image data written into the second scanning line is rewritten into the original image data at the second timing.

As apparent from the description above, image data of the same polarity are written into two scanning lines which belong to the same discharge channel. For example, with regard to the discharge channel 5 at the center, positive image data are written into the two left and right scanning lines. On the other hand, image data of the opposite polarity (negative polarity) are written into scanning lines which belong to the adjacent discharge channels. However, the present invention is not limited to this, and it is naturally possible to write image data of the opposite polarities into two left and right scanning lines in the same discharge channel. It is to be noted, however, that, in this instance, a boundary across which transition from the positive polarity to the negative polarity occurs is present in the liquid crystal of the display cell, and the transmission factor at this portion may sometimes matter.

Figure 5A:
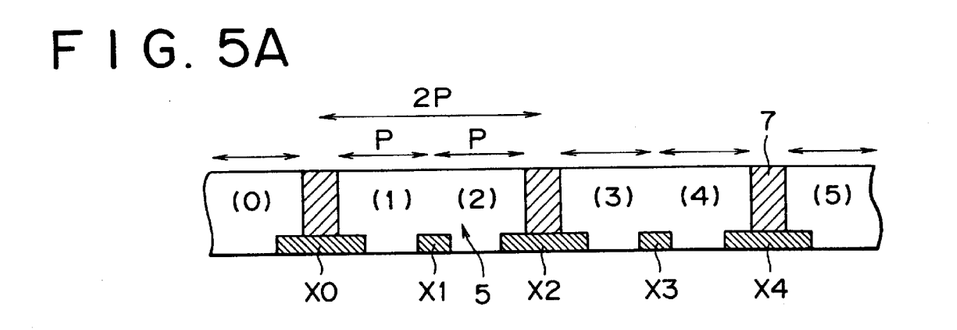
FIG. 5A is a schematic sectional view illustrating operation of writing image data into a plasma cell of the plasma address display apparatus shown in FIG. 4A.
Figure 5B:
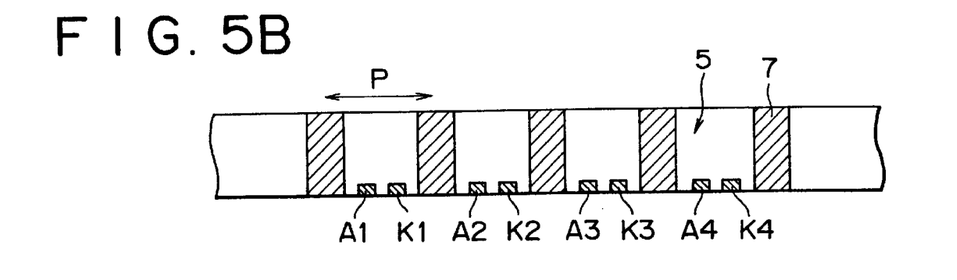
FIG. 5B is s similar view but illustrating operation of writing image data into a plasma cell of a conventional plasma address display apparatus.

FIG. 5A illustrates operation of the plasma address display apparatus when image data is written into the plasma cell, and FIG. 5B illustrates operation of a conventional address display apparatus when image data is written into its plasma cell. Referring first to FIG. 5A, in the plasma address display apparatus, first image data is written into the first scanning line and second image data is written into the second scanning line in the discharge channel 5 to which the scanning electrodes X1 and X2 are allocated. Both of the first and second image data have the positive polarity. The arrangement pitch of one scanning line is denoted by P. Since the discharge channel 5 includes two scanning lines, the arrangement pitch is 2P. Further, in the next discharge channel 5 to which the scanning electrodes X3 and X4 are allocated, third image data is written into the first scanning line and fourth image data is written into the second scanning line. Both of the third and fourth image data have the negative polarity. Thereafter, image data for two scanning lines are written into one discharge channel in a similar manner.

If notice is taken of the discharge channel 5 in which the first and second image data are written, it is preferable to control the boundary of the two image data so as to coincide with the location just above the central scanning electrode X1 as much as possible. The boundary between the first and second image data can be moved to a suitable position by adjusting the phase relationship between the selection pulse and the image data as described above with reference to FIG. 4B. Further, it is possible to move the boundary between the two data to an optimum position by adjusting the discharge current or the pressure of the discharge allowing gas.

Referring now to FIG. 5B, in the conventional plasma address display apparatus, one scanning line is allocated to one discharge channel 5. The scanning line is formed from an anode A and a cathode K in pair. Where the scanning line density is equivalent to that in the present invention, the arrangement pitch P of the discharge channels 5 is one half that of the plasma address display apparatus of the present invention. As apparent from comparison between FIGS. 5A and 5B, the number of the barriers 7 in the plasma address display apparatus according to the present invention can be reduced to one half when compared with that of the conventional plasma address display apparatus. Further, also it is possible to reduce the number of the scanning electrodes to one half that of the conventional example. As a result, augmentation of the productivity or augmentation of the numerical aperture can be achieved. Further, since the barriers 7 make a factor of intercepting the visual angle, the number of the barriers 7 should be minimized. In this connection, the structure of the present invention shown in FIG. 5A increases the visual angle of the screen because the number of the barriers 7 decreases to one half when compared with that of the conventional plasma address display apparatus shown in FIG. 5B.

Figure 6:
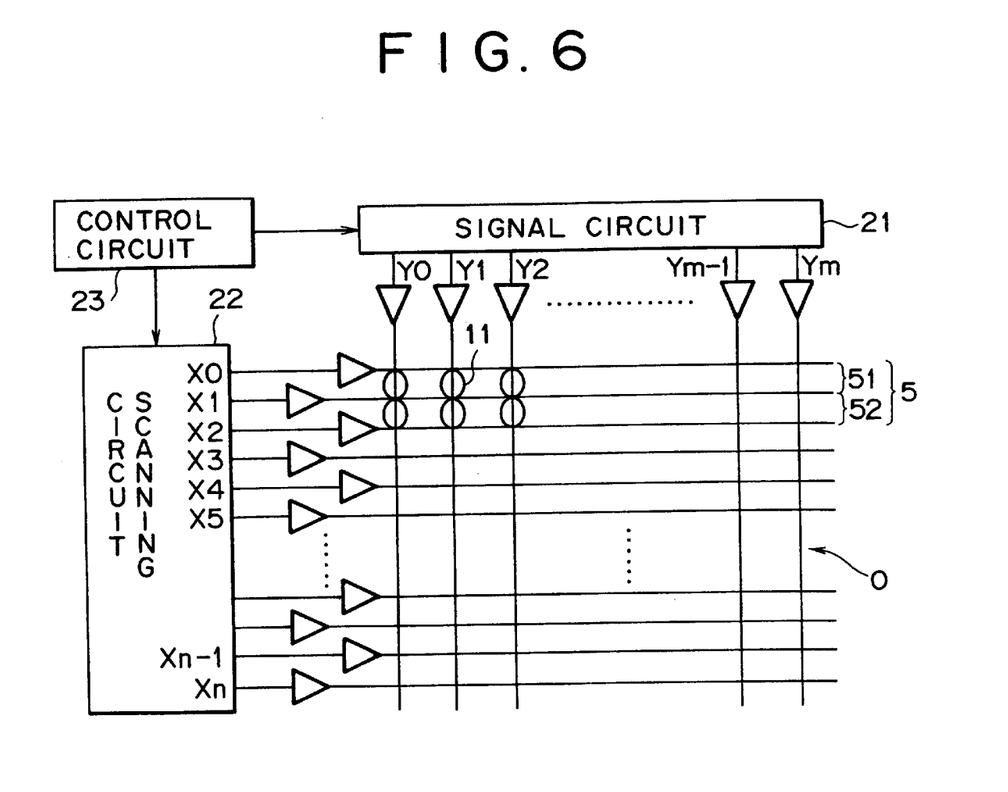
FIG. 6 is a circuit diagram showing an electric circuit system of the plasma address display apparatus shown in FIG. 4A.

FIG. 6 shows a circuit construction of the plasma address display apparatus described above. Referring to FIG. 8, the panel, peripheral signal circuit and scanning circuit mentioned hereinabove of the plasma address display apparatus are denoted at 0, 21 and 22, respectively. The plasma address display apparatus further includes a control circuit 23. As described hereinabove, the panel 0 has a layered structure wherein a plasma cell having scanning electrodes X0 to Xn disposed in rows and a display cell having signal electrodes Y0 to Ym disposed in columns are placed one on the other. The scanning circuit 22 successively applies a selection pulse to the scanning electrodes X0 to Xn to effect scanning of the display cell.

The signal circuit 21 supplies image data to the signal electrodes Y0 to Ym in synchronism with the scanning of the display cell to write the image data for individual scanning lines 51 and 52. The control circuit 23 performs synchronization control of the signal circuit 21 and the scanning circuit 22. As described above, the plasma cell has discharge channels 5 formed in columns such that they are isolated from each other, and discharge allowing gas is included in the discharge channels 5 and a plurality of scanning electrodes are applied to each of the discharge channels 5.

The scanning circuit 22 successively applies a selection pulse to a plurality of scanning electrodes (for example, X1 and X2) allocated to one discharge channel 5 to cause discharge to occur to form at least two scanning lines 51 and 52 in the discharge channel 5. Preferably, the signal circuit 21 writes image data of the same polarity to a plurality of scanning lines 51 and 52 which belong to one discharge channel 5 and writes image data of the opposite polarity to scanning lines which belong to adjacent discharge channels to effect ac driving of the display cell.

More particularly, the discharge channel 5 is composed of a pair of barriers which define a space extending in a column, scanning electrodes (for example, X0 and X2) disposed below the barriers, and a central scanning electrode X1 disposed in the middle between the scanning electrodes X0 and X2 on the opposite sides in the space. One of the scanning lines 51 and 52, that is, the scanning line 51, is defined between the scanning electrode X0 disposed below one of the barriers and the central scanning electrode X1, and the other scanning line 52 is defined between the scanning electrode X2 disposed below the other barrier and the central scanning electrode X1. The scanning circuit 22 applies a selection pulse to the central scanning electrode X1 to cause discharge to occur substantially in the entire discharge channel 5, and then applies a selection pulse to the scanning electrode X2 disposed below the other barrier to cause discharge to occur in a substantially one half of the discharge channel 5 thereby to form the two scanning lines 51 and 52 in the one discharge channel 5 together with the other half.

2. Second Embodiment

Figure 7:
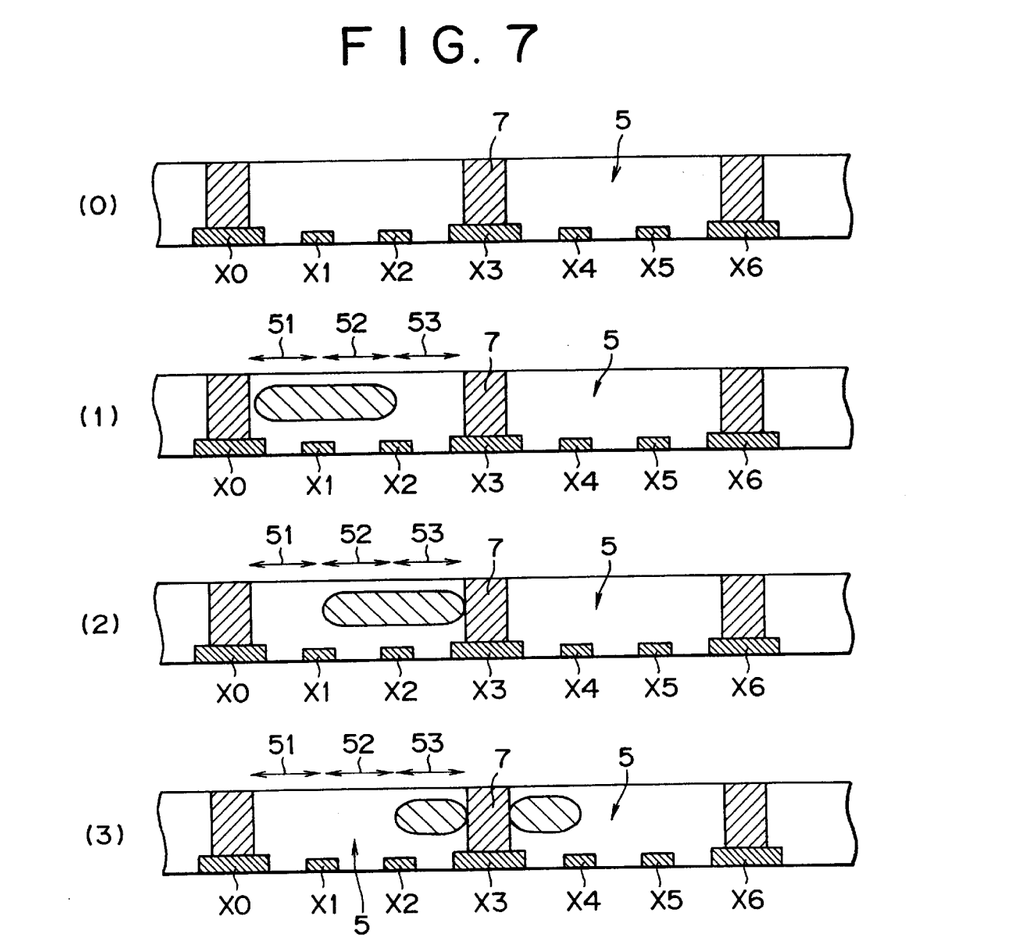
FIG. 7 is a schematic sectional view illustrating operation of another plasma address display apparatus to which the present invention is applied with respect to time.

FIG. 7 shows another plasma address display apparatus to which the present invention is applied and illustrates operation of the plasma address display apparatus with respect to time. The plasma address display apparatus is generally constructed such that three scanning lines are allocated to one discharge channel. Referring to FIG. 7, at the 0th timing of the operation of the plasma address display apparatus illustrated, three scanning electrodes X1, X2 and X3 are disposed in one discharge channel 5, and three scanning electrodes X4, X5 and X6 are disposed similarly in an adjacent discharge channel 5. At the first timing, a selection pulse is applied to the scanning electrode X1. As a result, plasma discharge occurs in the first discharge channel 5, and two scanning lines 51 and 52 are formed simultaneously. When the second timing comes, a selection pulse is applied to the scanning electrode X2, and plasma discharge occurs locally between the scanning electrodes X1 and X3 which are adjacent the scanning electrode X2. As a result, two scanning lines 52 and 53 are formed. Accordingly, image data written into the scanning line 52 at the first timing is rewritten immediately at the second timing, but the image data written in the scanning line 51 is maintained as it is as original data. Then, when the third timing comes, a selection pulse is applied to the scanning electrode X3, and plasma discharge occurs between the scanning electrodes X2 and X4 which are adjacent-the scanning electrode X3. If notice is taken of the first discharge channel 5, the third scanning line 53 is formed by the plasma discharge. Accordingly, the image data written into the scanning line 53 at the second timing is rewritten immediately at the third timing. However, the image data written in the scanning line 52 is maintained as it is as original data. From the foregoing, the three scanning lines 51, 52 and 53 are successively formed in the one discharge channel 5, and corresponding image data are written into them.

3. Third Embodiment

Figure 8:
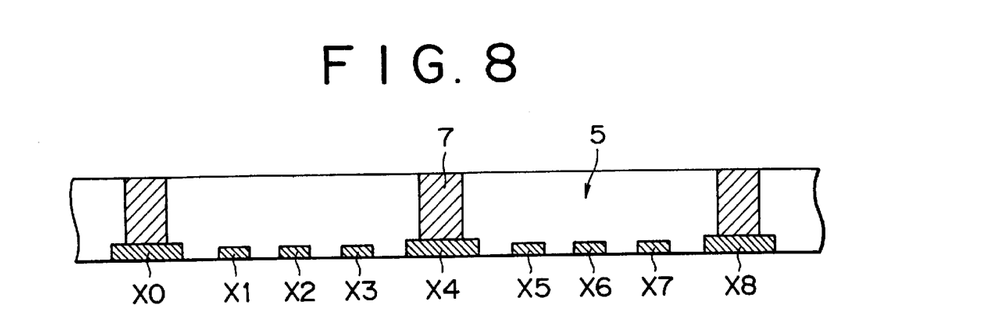
FIG. 8 is a schematic sectional view showing a structure of a plasma cell of a further plasma address display apparatus to which the present invention is applied.

FIG. 8 shows a further plasma address display apparatus to which the present invention is applied. Referring to FIG. 8, in the plasma address display apparatus shown, four scanning electrodes are allocated to one discharge channel 5. Thus, by applying a similar driving method to that described hereinabove, image data for four scanning lines can be written into one discharge channel 5.

4. Fourth Embodiment

Figure 9A:
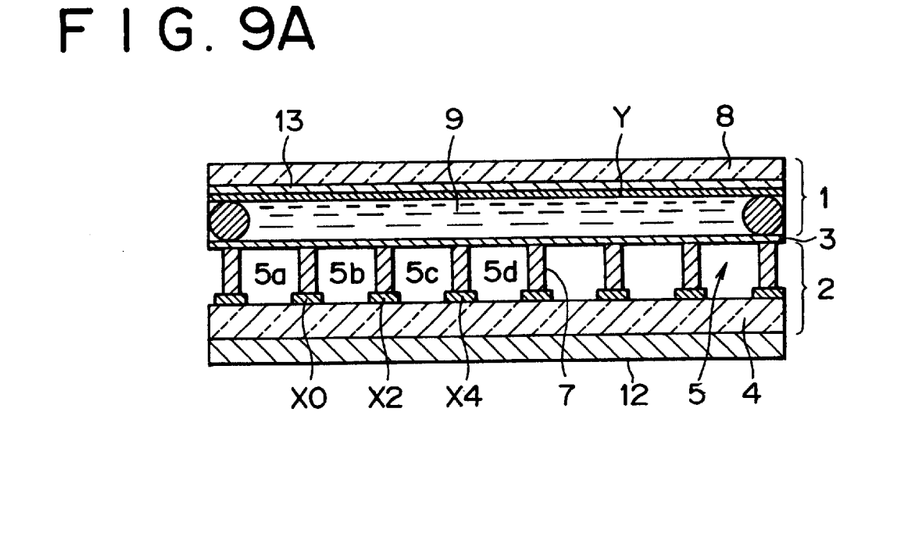
FIG. 9A is a schematic sectional view showing a still further plasma address display apparatus to the present invention is applied.

FIG. 9A shows a still further plasma address display apparatus to which the present invention is applied. The plasma address display apparatus is basically composed of a flat panel and a peripheral scanning circuit and signal circuit. FIG. 9A shows a structure of the flat panel. Referring to FIG. 9A, the flat panel has a layered structure wherein a display cell 1 and a plasma cell 2 are placed one on the other with a common intermediate sheet 3 interposed therebetween. The plasma cell 2 is formed from a lower side glass substrate 4 adhered to the intermediate sheet 3, and discharge allowing gas is enclosed between the lower side glass substrate 4 and the intermediate sheet 3. Scanning electrodes X0, X2, X4, . . . in the form of stripes are formed on an inner surface of the lower side glass substrate 4. Barriers 7 are formed along and just above the scanning electrodes X0, X2, X4, . . . , and divide the space in which the discharge allowing gas is enclosed to define discharge channels 5. It is to be noted that, for the convenience of description, in order to distinguish the discharge channels, they are represented like 5a, 5b and 5c. The barriers 7 are formed, for example, by screen printing and contact at the tops thereof with a lower face of the intermediate sheet 3. As seen in FIG. 9A, the adjacent discharge channels 5a, 5b, 5c, . . . are isolated from each other by the barriers 7.

The display cell 1 includes an upper side glass substrate 8. The glass substrate 8 is adhered to an upper face side of the intermediate sheet 3 formed from a thin glass plate or the like with a predetermined gap left therebetween by a seal member or the like, and liquid crystal 9 is enclosed in the gap. Signal electrodes Y are formed on an inner surface of the upper glass substrate 8. Pixels in the form of a matrix are formed at intersecting locations of the signal electrodes Y and the discharge channels 5. A color filter 13 is provided on the inner surface of the glass substrate 8 and allocates, for example, three primary colors of R, G and B to the pixels. The flat panel having the construction described above is of the transmission type, and, for example, the plasma cell 2 is positioned on the light incoming side while the display cell 1 is positioned on the light outgoing side. A backlight 12 is mounted on the plasma cell 2 side.

Figure 9B:
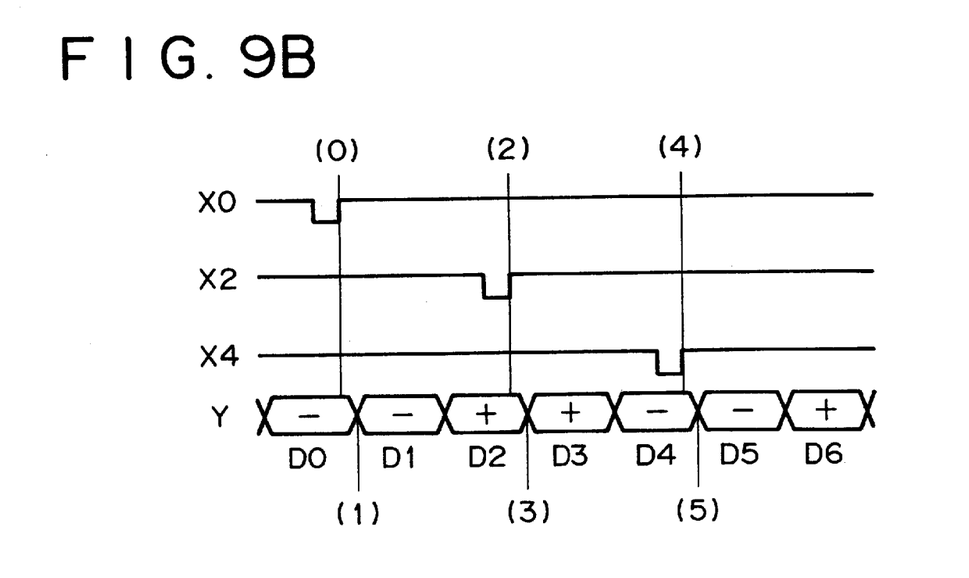
FIG. 9B is a timing chart illustrating operation of the plasma address display apparatus shown in FIG. 9A.

FIG. 9B is a timing chart illustrating operation of the plasma address display apparatus described above. Referring to FIG. 9B, the peripheral scanning circuit successively applies a selection pulse to the scanning electrodes X0, X2, X4, . . . . The selection pulses have a negative polarity with respect to the ground potential (anode potential). In the operation illustrated in FIG. 9B, at the 0th timing, a selection pulse is applied to the scanning electrode X0 to cause plasma discharge to occur in the discharge channel 5a. In this instance, the scanning electrode X0 to which the selection pulse of the negative polarity is applied functions as a cathode, and the scanning electrodes of the ground potential positioned on the opposite sides of the scanning electrode X0 function as anodes. Plasma discharge occurs between the two anodes and the cathode.

Then, at the second timing, a selection pulse is applied to the scanning electrode X2 to cause plasma discharge to occur in the discharge channels 5b and 5c. In this instance, the scanning electrode X2 to which the selection pulse is applied functions as the cathode, and the scanning electrode X0 which has restored the ground potential and the other scanning electrode X4 function as anodes.

Similarly, at the fourth timing, a selection pulse is applied to the scanning electrode X4 to cause plasma discharge to occur in the discharge channels 5c and 5d. Thereafter, a selection pulse is successively applied to the scanning electrodes X in a similar manner.

The peripheral signal circuit supplies image data to all of the signal electrodes Y in synchronism with the scanning circuit. In the operation illustrated in FIG. 9B, the peripheral signal circuit supplies image data D0 of the negative polarity at the 0th timing and then supplies image data D1 of the same negative polarity at the first timing. The image data D0 and D1 of the negative polarity are written into two scanning lines formed in the discharge channel 5a.

Then at the second timing, image data D2 of the positive polarity is supplied, and further at the third timing, the data changes over to image data D3 of the positive polarity. The image data D2 and D3 are written into two scanning lines formed in the discharge channel 5b. Thereafter, at the fourth timing, image data D4 of the negative polarity is supplied, and further at the fifth timing, the data changes over to another image data D5 of the negative polarity in a similar manner. The image data D4 and D5 are written into two scanning lines formed in the discharge channel 5c.

In the plasma address display apparatus, the peripheral scanning circuit applies a selection pulse to scanning electrodes X allocated to one discharge channel 5 to cause discharge to occur between an anode and a cathode and makes use of a transition state after the discharge to form two scanning lines in the one discharge channel 5. The signal circuit supplies image data D to signal electrodes Y in response to the transition state after the discharge to write separate data (D0, D1), (D2, D3), (D4, D5), . . . into each two scanning lines.

For example, at the 0th timing, the image data D0 of the negative polarity supplied to the signal electrodes Y is written at a point of time when the selection pulse applied to the scanning electrode X0 restores the ground level, and the image data D0 is written into pixels of both of the two scanning lines formed imaginarily in the discharge channel 5a. Then at the first timing, the image data supplied to the signal electrodes Y changes over from D0 to D1. At this point of time, the first scanning line formed in the discharge channel 5a is put into an off state while the second scanning line maintains its on state. Accordingly, the image data D1 is newly written into the second scanning line with the image data D0 erased. Thereafter, before the image data changes over from D1 to D2, the second scanning line changes from the on state to an off state, and consequently, the image data D1 written therein is maintained as it is.

Then at the second timing, the image data D2 of the positive polarity supplied to the signal electrodes Y is written into all of the scanning lines formed in the discharge channel 5b at a point of time when the selection pulse applied to the scanning electrode X2 restores the ground level. Then at the third timing, the scanning electrode D2 changes over to D3. At this point of time, the first scanning line out of the scanning lines in which the image data D2 is written changes from the on state to an off state while the second scanning line maintains its on state. Accordingly, the image data D3 is newly written into the second scanning line with the image data D2 erased.

In this manner, the signal circuit in the plasma address display apparatus writes the image data D0 and D1 of the same polarity into two scanning lines which belong to one discharge channel 5a, and writes the image data D2 and D3 of the opposite polarity into two scanning lines which belong to an adjacent discharge channel 5b to effect ac driving of the display cell 1.

In the plasma address display apparatus, each of the discharge channels 5 is formed from a pair of barriers 7 which define a space extending in a row, and the scanning electrodes X0, X2, X4, . . . which are disposed below the barriers 7 and individually function as an anode and a cathode. Two scanning lines included in each discharge channel 5 are spatially separated from each other across the boundary in the middle between a pair of barriers 7. It is to be noted that, according to circumstances, each discharge channel 5 may include an additional scanning electrode along the middle between a pair of barriers 7 so that discharge between an anode and a cathode may be assisted.

Figure 10A:
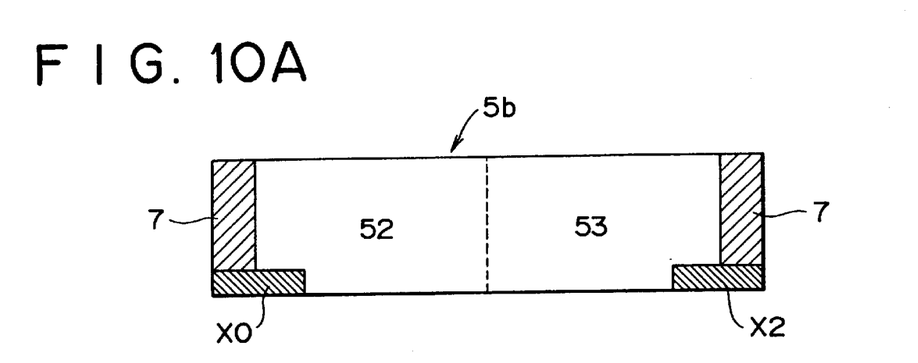
FIG. 10A is a sectional view schematically showing a discharge channel of the plasma address display apparatus shown in FIG. 9A.
Figure 10B:
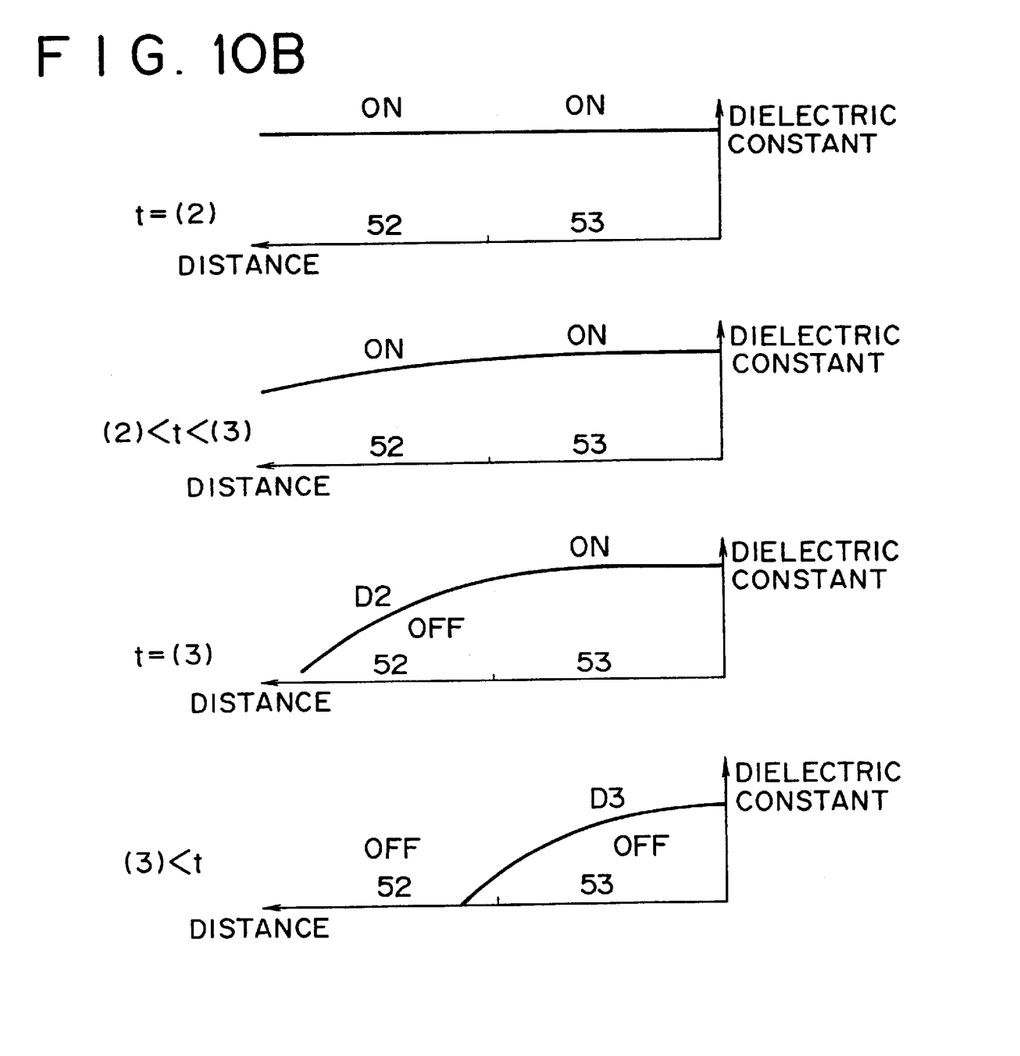
FIG. 10B is a schematic view illustrating operation of a plasma cell of the plasma address display apparatus shown in FIG. 9A with respect to time.

Operation of the plasma address display apparatus shown in FIG. 9A is described in detail with reference to FIGS. 10A and 10B. In FIG. 10A, the discharge channel 5b is shown schematically. The discharge channel 5b is spatially divided into two forward and backward scanning line 52 and 53 substantially in the middle between a pair of barriers 7. In the following, a variation of the internal state of the discharge channel 5b is described with respect to time with reference to FIGS. 9B and 10B. At the timing (2) (refer to FIG. 9B), a selection pulse applied to the scanning electrode X2 falls, and at this point of time, plasma discharge in the discharge channel 5b comes to an end. At this point of time, since a large number of charged particles generated by the plasma discharge remain in the discharge channel 5b, the dielectric factor of the internal space of the discharge channel 5b is high and the scanning lines 52 and 53 which both function as virtual switches are both in an on-state.

Then, upon transition from the timing (2) to the timing (3), the metastable particles in the discharge channel 5b gradually disappear, and consequently, the dielectric constant of the internal space drops. In this instance, since the spatial distribution of the metastable particles in the discharge channel 5b has some local variation, the dielectric constant exhibits a greater drop away from the scanning electrode X2 to which the selection pulse is applied. Just when the timing (3) comes, since the dielectric constant on the scanning line 52 side drops significantly, the scanning line 52 is equivalently put into an off-state. At this point of time, the image data D2 is sample held by the pixels on the scanning line 52 side. Just at the timing (3), the image data changes over from D2 to D3. At the point of time of the timing (3), the dielectric constant of the other scanning line 53 still remains in a high state, and the equivalent switch still remains in an on-state. Accordingly, the image data D3 after the data changes over is written into the scanning line 53. After a little later than the timing (3), since the dielectric constant on the scanning line 53 side also drops, the equivalent switch becomes an off-state. At this point of time, the image data D3 is sample held by the pixels on the scanning line 53 side.

5. Fifth Embodiment

Figure 11:
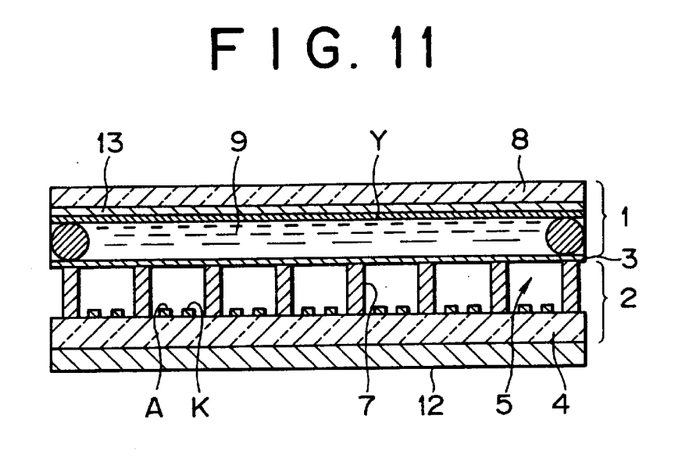
FIG. 11 is a schematic sectional view showing a yet further plasma address display apparatus to which the present invention is applied.

FIG. 11 shows a yet further plasma address display apparatus to which the present invention is applied. The present plasma address display apparatus is basically similar to the plasma address display apparatus described hereinabove with reference to FIG. 9A, but is different in that, in each of the discharge channels 5, a pair of scanning electrodes which function as an anode A and a cathode K are formed between a pair of barriers 7 which define a space extending in a row. In the plasma address display apparatus shown in FIG. 9A, each scanning electrode is disposed below a barrier 7, and the scanning electrodes are alternately switched as an anode A and a cathode K to scan the discharge channels 5. In contrast, in the present plasma address display apparatus, those scanning electrodes which function as a cathode K and those scanning electrodes which function as an anode A are provided in the individual discharge channels 5 such that they have fixed roles. In the present plasma address display apparatus, two scanning lines included in each of the discharge channels 5 are spatially separated from each other across the boundary in the middle between a pair of scanning electrodes which function as an anode and a cathode.

Figure 12:
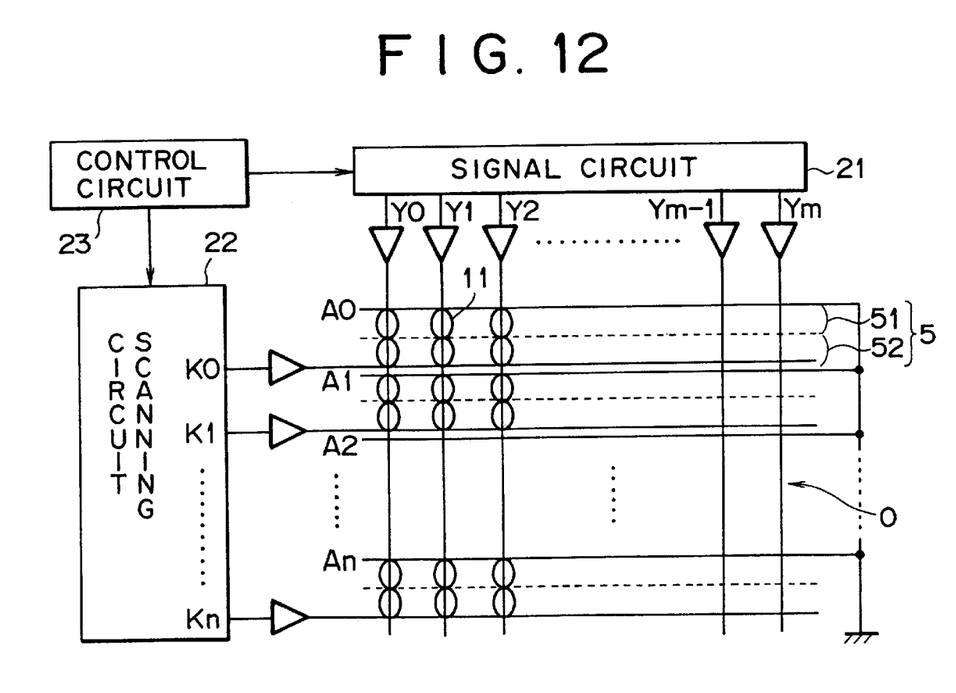
FIG. 12 is a circuit diagram showing an electric circuit system of the plasma address display apparatus shown in FIG. 11.

FIG. 12 shows an electric circuit construction of the plasma address display apparatus of FIG. 11. Referring to FIG. 12, the present plasma address display apparatus is basically composed of a panel 0, a signal circuit 21, a scanning circuit 22 and a control circuit 23. The panel 0 has a layered structure wherein a plasma cell having discharge channels 5 disposed in rows and a display cell having signal electrodes Y0 to Ym disposed in columns are placed one on the other. An anode A and a cathode K in pair are formed in each of the discharge channels 5. The anodes A0 to An are grounded while the cathodes K0 to Kn are connected to the scanning circuit 22. The scanning circuit 22 successively applies a selection pulse to the cathodes K0 to Kn to perform scanning of the display cell. The signal circuit 21 supplies image data to the signal electrodes Y0 to Ym in synchronism with the scanning by the scanning circuit 22 to write the image data into the two scanning lines 51 and 52 formed in each of the discharge channels 5. The control circuit 23 performs synchronization control of the signal circuit 21 and the scanning circuit 22.

As described above, the plasma cell has the discharge channels 5 in rows formed therein in an isolated relationship from each other, and each of the discharge channels 5 contains discharge allowing gas therein and has two scanning lines 51 and 52 formed in a spatially separated condition. The scanning circuit 22 applies a selection pulse to the cathode K allocated to one discharge channel 5 to cause discharge to occur between the anode A and the cathode K and makes use of a transition state after the discharge to form the two scanning lines 51 and 52 in the discharge channel 5. The signal circuit 21 supplies image data to the signal electrodes Y0 to Ym in response to the transition state after the discharge to write the individual image data into the pixels 11 on the two scanning lines 51 and 52.

While preferred embodiments of the present invention have been described using specific terms, such description is for illustrative purposes only, and it is to be understood that changes and variations may be made without departing from the spirit or scope of the following claims.

What is claimed is:

1. A plasma address display apparatus, comprising:
   a plasma cell comprising a plurality of scanning electrodes disposed in rows, discharge channels between rows, and discharge gas in the discharge channels;
   a display cell comprising a plurality of signal electrodes disposed in columns coupled to the plasma cell;
   a scanning circuit for successively applying selection pulses to said scanning electrodes; and
   a signal circuit for supplying image data to said signal electrodes;
   wherein the selection pulses create a first scanning line and a second scanning line in a selected discharge channel;
   wherein the selected discharge channel comprises a first scanning electrode supporting a first barrier, a second scanning electrode supporting a second barrier, and a central scanning electrode between the first scanning electrode and the second scanning electrode, and wherein the first scanning line is created between the first scanning electrode and the central scanning electrode, and the second scanning line is created between the central scanning electrode and the second scanning electrode; and
   wherein the selection pulses include a first selection pulse applied to the central scanning electrode that is operative to cause discharge in the selected discharge channel for both the first and second scanning lines in the selected discharge channel, and a second selection pulse applied to the second scanning electrode that is operative to cause discharge in a portion of the selected discharge channel corresponding to the second scanning line without causing discharge in the selected discharge channel for the first scanning line.

2. A plasma address display apparatus, comprising:

a plasma cell comprising a plurality of scanning electrodes disposed in rows, discharge channels between rows, and discharge gas in the discharge channels;

a display cell comprising a plurality of signal electrodes disposed in columns coupled to the plasma cell;

a scanning circuit for applying a selection pulse to a selected one of the discharge channels to place the selected discharge channel in an on-state; and a signal circuit for supplying image data to said signal electrodes;

wherein the image data comprises, for the selected discharge channel, first image data for a first scanning line in the selected discharge channel followed at a predetermined time delay after the selection pulse by second image data for a second scanning line in the selected discharge channel, and wherein the predetermined time delay provides time for the first scanning line of the selected discharge channel to transition to an off-state.

3. A plasma address display apparatus according to claim 2, wherein said signal circuit supplies positive polarity image data to the selected discharge channel and supplies negative polarity image data to adjacent discharge channels that are adjacent to the selected discharge channel.

4. A plasma display apparatus according to claim 2, wherein the selected discharge channel comprises a first scanning electrode supporting a first barrier, a second scanning electrode supporting a second barrier, and wherein the first scanning line is created in a first scanning line portion of the selected discharge channel, and wherein the second scanning line is created in a second scanning line portion of the selected discharge channel that remains in an on-state after the predetermined time delay.

5. A plasma address display apparatus according to claim 4, wherein the selected discharge channel further comprises an additional scanning electrode between the first and second scanning electrode.

6. A plasma address display apparatus according to claim 2, wherein the selected discharge channel comprises a first scanning electrode, a first barrier, a second scanning electrode, and a second barrier, and wherein the first scanning electrode and the second scanning electrode comprise anode and cathode scanning electrodes between the first and second barriers.

7. A display, comprising:

a discharge cell comprising a first discharge channel formed between a first barrier and a second barrier and further comprising a first peripheral discharge electrode and a second peripheral discharge electrode;

a display cell comprising a signal electrode across the first discharge channel, the display cell coupled to the discharge cell;

a scanning circuit for applying selection pulses including a first selection pulse to at least one of the first and second peripheral discharge electrodes to place at least a portion of the discharge channel in an on-state; and a signal circuit for supplying image data to the signal electrode;

wherein the selection pulses create a first scanning line and a second scanning line in the discharge channel, wherein the image data comprises first image data for the first scanning line followed at a predetermined time delay after the selection pulse by second image data for the second scanning line, and wherein the predetermined time delay provides time for a first scanning line portion of the discharge channel to transition to an off-state.

8. A display, comprising:

a discharge cell comprising a first discharge channel formed between a first barrier and a second barrier and further comprising a first peripheral discharge electrode and a second peripheral discharge electrode;

a display cell comprising a signal electrode across the first discharge channel, the display cell coupled to the discharge cell;

a scanning circuit for applying selection pulses including a first selection pulse to at least one of the first and second peripheral discharge electrodes to place at least a portion of the discharge channel in an on-state; and a signal circuit for supplying image data to the signal electrode;

wherein the selection pulses create a first scanning line and a second scanning line in the discharge channel, wherein the image data comprises first image data for the first scanning line followed at a predetermined time delay after the selection pulse by second image data for the second scanning line, and wherein the predetermined time delay provides time for a first scanning line portion dielectric constant of the discharge channel to drop below a predetermined level.

9. A display, comprising:

a discharge cell comprising a first discharge channel formed between a first barrier and a second barrier and further comprising a first peripheral discharge electrode and a second peripheral discharge electrode;

a display cell comprising a signal electrode across the first discharge channel, the display cell coupled to the discharge cell;

a scanning circuit for applying selection pulses including a first selection pulse to at least one of the first and second peripheral discharge electrodes to place at least a portion of the discharge channel in an on-state; and a signal circuit for supplying image data to the signal electrode;

a second discharge channel adjacent to the first discharge channel;

wherein the selection pulses create a first scanning line and a second scanning line in the discharge channel, wherein the discharge cell further comprises a first inner scanning electrode between the first and second peripheral discharge scanning electrodes, and wherein the first selection pulse places a first portion of the discharge channel between the first peripheral scanning electrode and the first inner scanning electrode in the on-state, and wherein the scanning circuit further provides a second selection pulse to the first inner scanning electrode that places the discharge channel between the first and second peripheral scanning electrodes in the on-state, and a third selection pulse to the second scanning electrode that places a second portion of the discharge channel between the first inner scanning electrode and the second peripheral scanning electrode in the on-state.

10. A display, comprising:

a discharge cell comprising a first discharge channel formed between a first barrier and a second barrier and further comprising a first peripheral discharge electrode and a second peripheral discharge electrode;

a display cell comprising a signal electrode across the first discharge channel, the display cell coupled to the discharge cell;

a scanning circuit for applying selection pulses including a first selection pulse to at least one of the first and second peripheral discharge electrodes to place at least a portion of the discharge channel in an on-state; and a signal circuit for supplying image data to the signal electrode;

wherein the selection pulses create a first scanning line and a second scanning line in the discharge channel, and wherein the discharge cell further comprises first and second inner scanning electrodes between the first and second peripheral scanning electrodes, and wherein the selection pulses and the image data create a first scanning line, a second scanning line, and third scanning line in the discharge channel.

11. A display, comprising:

a discharge cell comprising a first discharge channel formed between a first barrier and a second barrier and further comprising a first peripheral discharge electrode and a second peripheral discharge electrode;

a display cell comprising a signal electrode across the first discharge channel, the display cell coupled to the discharge cell;

a scanning circuit for applying selection pulses including a first selection pulse to at least one of the first and second peripheral discharge electrodes to place at least a portion of the discharge channel in an on-state; and a signal circuit for supplying image data to the signal electrode;

wherein the selection pulses create a first scanning line and a second scanning line in the discharge channel, and wherein the discharge cell further comprises first, second, and third inner scanning electrodes between the first and second peripheral scanning electrodes, and wherein the selection pulses and the image data create a first scanning line, a second scanning line, a third scanning line, and a fourth scanning line in the discharge channel.

* * * * *